(12) United States Patent
Hewitt et al.

(10) Patent No.: US 11,687,056 B2
(45) Date of Patent: Jun. 27, 2023

(54) MACHINERY CONVERSION PIVOT OPPORTUNITY IDENTIFICATION

(71) Applicant: International Business Machines Corporation, Armonk, NY (US)

(72) Inventors: Trudy L. Hewitt, Cary, NC (US); Zachary A. Silverstein, Austin, TX (US); Alan Chung, Hopewell Junction, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 17/122,106

(22) Filed: Dec. 15, 2020

(65) Prior Publication Data

US 2022/0187784 A1 Jun. 16, 2022

(51) Int. Cl.
*G05B 19/402* (2006.01)

(52) U.S. Cl.
CPC .. *G05B 19/402* (2013.01); *G05B 2219/49311* (2013.01)

(58) Field of Classification Search
CPC ............ G05B 19/402; G05B 19/41865; G05B 2219/31396; G05B 2219/31408; G05B 2219/49311; G06Q 10/00; Y02P 90/30
See application file for complete search history.

(56) References Cited

U.S. PATENT DOCUMENTS

| | | | |
|---|---|---|---|
| 6,349,237 B1 * | 2/2002 | Koren | B23Q 39/02 700/94 |
| 8,417,360 B2 | 4/2013 | Sustaeta | |
| 2013/0190913 A1 | 7/2013 | Lamparter | |
| 2015/0112755 A1 | 4/2015 | Potdar | |
| 2017/0359418 A1 * | 12/2017 | Sustaeta | G05B 13/024 |
| 2019/0188737 A1 * | 6/2019 | Asenjo | H04L 67/1097 |
| 2021/0149384 A1 * | 5/2021 | Dittmer | H04L 43/16 |

OTHER PUBLICATIONS

Cui et al. (Manufacturing big data ecosystem: a systematic literature review , Apr. 2020, Robotics and Computer-Integrated Manufacturing, p. p. 1-2 (Year: 2020).*
Angelva et al. Real-time data management in a flexible manufacturing system (FMS), 1995, Journal of Materials Processing Technology 52 (1995) p. 76-82. (Year: 1995).*
Hamilton, John, "The Strategic Change Matrix and Business Sustainability across COVID-19", Sustainability 12, No. 15, 6026, MDPI, Jul. 27, 2020, 19 Pages.
IBM, "IBM Sterling Warehouse Management System Overview", IBM Knowledge Center, Accessed on Aug. 26, 2020, 2 Pages.
(Continued)

*Primary Examiner* — Kidest Bahta
(74) *Attorney, Agent, or Firm* — Stephanie L. Carusillo

(57) ABSTRACT

In an approach for identifying machinery conversion pivot opportunities utilizing a crowdsourced database, a processor receives machinery information for machinery of a user. A processor identifies a plurality of alternative uses for the machinery from a public cloud database based on the machinery information. A processor ranks the plurality of alternative uses for the machinery based on a set of factors. A processor sends the ranked plurality of alternative uses for the machinery to the user.

17 Claims, 5 Drawing Sheets

(56) References Cited

OTHER PUBLICATIONS

Jack, Simon, "Coronavirus: Government orders 10,000 ventilators from Dyson", BBC News, Mar. 26, 2020, 14 Pages.

Lesavage, Halie, "American Apparel Owner Gildan Considers Permanent Move to Making Masks", Retail Brew, Manufacturing, May 4, 2020, 3 Pages.

Marut, Mike, "Vape e-liquid manufacturer changes course to bottle hand sanitizer amid coronavirus outbreak", KVUE News, Austin, Texas, Apr. 6, 2020, 4 Pages.

Miller, Norman, "How factories change production to quickly fight coronavirus", BBC, Apr. 13, 2020, 9 Pages.

Okorie et al., "Manufacturing in the Time of COVID-19: An Assessment of Barriers and Enablers", IEEE Engineering Management Review, Jul. 29, 2020, 9 Pages.

Osan et al., "Optimizing production in the age of the machine", McKinsey & Company, Oct. 10, 2017, 7 Pages.

\* cited by examiner

MACHINERY CONVERSION PIVOT OPPORTUNITY IDENTIFICATION

BACKGROUND OF THE INVENTION

The present invention relates generally to the field of data processing, and more particularly to machinery conversion pivot opportunity identification utilizing a crowdsourced database.

Manufacturing is the assembly of finished goods for sale or use from raw materials by the use of manual labor or machinery and is typically carried out systemically with a division of labor. Examples of manufacturing industries include, but are not limited to, those that produce consumer goods (i.e., food, beverages, clothing, cosmetics, toiletries, etc.), medications, medical devices, healthcare supplies, furniture, sports equipment, toys, computers, consumer electronics, electrical equipment, heavy machinery, building materials, tools, chemicals, refined petroleum products, steel, ships, aircrafts, and automobiles.

Manufacturing machinery is a power-driven tool used to perform specific operations on raw man-made materials to produce durable goods. Manufacturing machinery ranges from small machinery mounted on workbenches to large production machinery. Manufacturing machinery includes, but is not limited to, turning machines, shapers and planers, drilling machines, milling machines, grinding machines, power saws, and presses.

SUMMARY

Aspects of an embodiment of the present invention disclose a method, computer program product, and computer system for utilizing a crowdsourced database to identify potential opportunities for manufacturing businesses to pivot resources away from the production of one good and to pivot those same resources towards the production of another good. A processor receives machinery information for machinery of a user. A processor identifies a plurality of alternative uses for the machinery from a public cloud database based on the machinery information. A processor ranks the plurality of alternative uses for the machinery based on a set of factors. A processor sends the ranked plurality of alternative uses for the machinery to the user.

In some aspects of an embodiment of the present invention, a processor compares machinery information to information about uses for other machinery stored in the public cloud database.

In some aspects of an embodiment of the present invention, the machinery information comprises blueprints, current use, total manufacturing cycle time, total manufacturing output capacity, throughput, capacity utilization, overall effectiveness of a piece of production equipment, overall effectiveness of an entire production line, production attainment scores, planned maintenance percentage, availability, first pass yield, overall yield, customer returns, supplier quality incoming rate, supplier defect rate, and customer fill rate, on-time delivery, and perfect order percentage rate.

In some aspects of an embodiment of the present invention, a processor identifies at least one of an industry recommended alternative use and a marketplace recommended alternative use.

In some aspects of an embodiment of the present invention, the set of factors comprises resources of the user, a time required to modify the machinery from an original use to a respective alternative use, a cost required to modify and convert the machinery, a projected revenue expected from production of new goods based on the respective alternative use, a return on investment, skills needed by labor force to operate the machinery once modified, and permanency of modifications to the machinery.

In some aspects of an embodiment of the present invention, a processor determines whether a threshold is met. Responsive to determining the threshold is met, a processor sends the ranked plurality of alternative uses for the machinery to the user.

In some aspects of an embodiment of the present invention, the public cloud database is crowd sourced.

DETAILED DESCRIPTION

Embodiments of the present invention recognize that, in times of crisis, manufacturing companies must make strategic and responsible moves in order to respond to disruptions in operations, to capitalize on opportunities for growth, to support a local community, and, most importantly, to remain relevant. Embodiments of the present invention recognize that business owners need a way to determine whether they can pivot the use of their manufacturing machinery to produce goods that are in high demand and to determine the technical, economical, legal, and operational feasibility of modifying their current manufacturing machinery.

Embodiments of the present invention provide a system and method that captures baseline measurements of a user's manufacturing machinery through manual training, big data analytics clustering, and/or natural language processing of metadata. Embodiments of the present invention create a user profile with the collected data, categorize the user's manufacturing machinery, and store the user profile in a local database and/or in a public, crowdsourced, cloud-based database.

Embodiments of the present invention further provide a system and method to identify possible alternative uses for a user's manufacturing machinery through a cloud-based module that compares the user's manufacturing machinery and factory capabilities to information about other manufacturing machineries and factories stored in the public, crowdsourced, cloud-based database and/or through industry and/or marketplace recommended alternatives. Embodiments of the present invention rank the alternative uses using a number of factors and then send an alert notifying the user of the alternative uses. Embodiments of the present invention store the alternative uses and the factors used to rank the alternative uses for future iterative feedback in the local database and/or in the public, crowdsourced, cloud-based database.

Implementation of embodiments of the invention may take a variety of forms, and exemplary implementation details are discussed subsequently with reference to the Figures.

Figure 1:
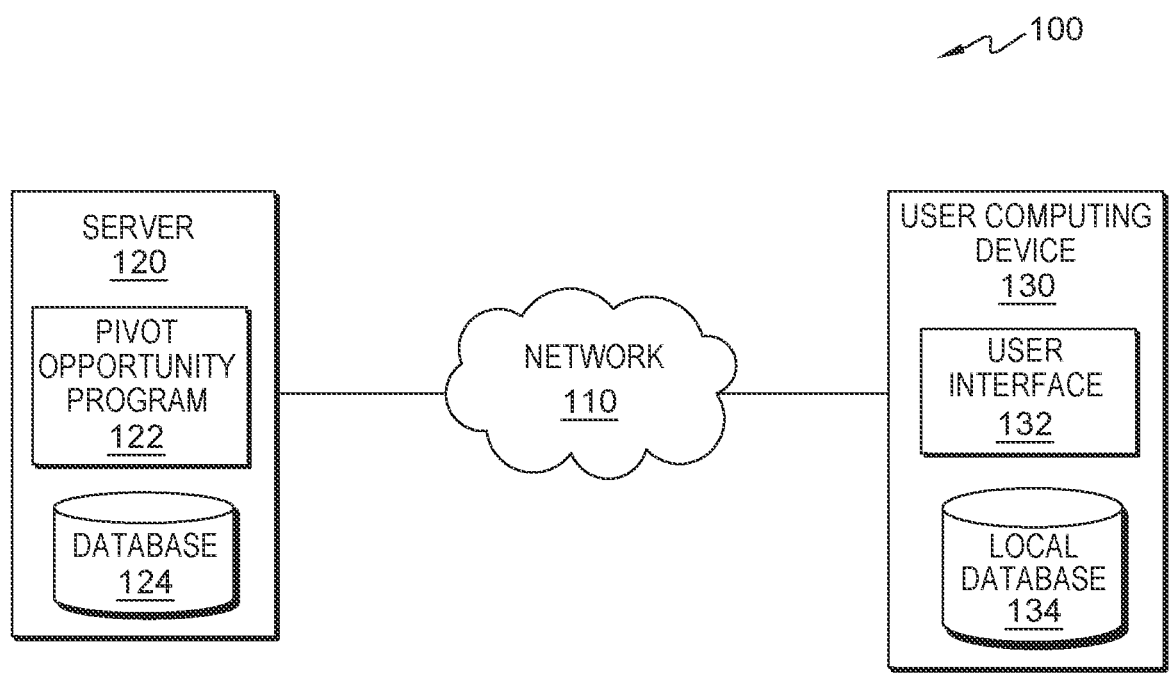
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. In the depicted embodiment, distributed data processing environment 100 includes server 120 and user device computing device 130, interconnected over network 110. Distributed data processing environment 100 may include additional servers, computers, computing devices, IoT sensors, and other devices not shown. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 120, user computing device 130, and other computing devices (not shown) within distributed data processing environment 100.

Server 120 operates to run pivot opportunity program 122 and to send and/or store data in database 124. In an embodiment, server 120 can send data from database 124 to user computing device 130. In an embodiment, server 120 can receive data in database 124 from user computing device 130. In one or more embodiments, server 120 can be a standalone computing device, a management server, a web server, a mobile computing device, or any other electronic device or computing system capable of receiving, sending, and processing data. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 5.

Pivot opportunity program 122 operates to identify potential opportunities for manufacturing businesses to pivot resources away from the production of one good and to pivot those same resources towards the production of another good. In the depicted embodiment, pivot opportunity program 122 is a standalone program. In another embodiment, pivot opportunity program 122 may be integrated into another software product, such as an asset management platform. In an embodiment, a user opts-in to the use of pivot opportunity program 122 and sets up a user profile with pivot opportunity program 122. The setup component of pivot opportunity program 122 is depicted and described in further detail with respect to FIG. 2. The two main components of pivot opportunity program 122, the pull and push components for identifying potential opportunities for manufacturing businesses to pivot resources away from the production of one good and to pivot those same resources towards the production of another good, are depicted and described in further detail with respect to FIGS. 3 and 4. In the depicted embodiment, pivot opportunity program 122 resides on server 120. In other embodiments, pivot opportunity program 122 may reside on user computing device 130 or on another computing device (not shown), provided that pivot opportunity program 122 has access to network 110.

Database 124 operates as a public, crowd-sourced, cloud-based repository for data received, used, and/or generated by pivot opportunity program 122. A database is an organized collection of data. Data includes, but is not limited to, a plurality of user profiles with information input by users during setup regarding the user's manufacturing machinery and the user's factory, as well as user preferences (i.e., user system settings, alert notification settings, and machine-learned data), alert notification preferences, manufacturing preferences, and alternative use preferences; a plurality of alternative uses and factors considered in the determination of whether to modify the user's manufacturing machinery; information input by users about alternative uses for the user's manufacturing machinery; and any other data received, used, and/or generated by pivot opportunity program 122.

Database 124 can be implemented with any type of device capable of storing data and configuration files that can be accessed and utilized by server 120, such as a hard disk drive, a database server, or a flash memory. In an embodiment, database 124 is accessed by pivot opportunity program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that pivot opportunity program 122 has access to database 124.

The present invention may contain various accessible data sources, such as database 124 and/or local database 134, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Pivot opportunity program 122 enables the authorized and secure processing of personal data.

Pivot opportunity program 122 provides informed consent, with notice of the collection of personal and/or confidential company data, allowing the user to opt-in or to opt-out of processing personal and/or confidential company data. Consent can take several forms. Opt-in consent can impose on the user the opportunity to take an affirmative action before personal and/or confidential company data is processed. Alternatively, opt-out consent can impose on the user the opportunity to take an affirmative action to prevent the processing of personal and/or confidential company data before personal and/or confidential company data is processed. Pivot opportunity program 122 provides information regarding personal and/or confidential company data and the nature (e.g., type, scope, purpose, duration, etc.) of the processing. Pivot opportunity program 122 provides the user with copies of stored personal and/or confidential company data. Pivot opportunity program 122 allows the correction or completion of incorrect or incomplete personal and/or confidential company data. Pivot opportunity program 122 allows for the immediate deletion of personal and/or confidential company data.

User computing device 130 operates to run user interface 132 and local database 134. In an embodiment, user computing device 130 may be an electronic device, such as a laptop computer, a tablet computer, a netbook computer, a personal computer, a desktop computer, a smart phone, or any programmable electronic device capable of running user interface 132 and communicating (i.e., sending and receiving data) with pivot opportunity program 122 via network 110. In the depicted embodiment, user computing device 130 includes an instance of user interface 132. User computing device 130 may include components as described in further detail in FIG. 5.

User interface 132 operates as a local user interface between pivot opportunity program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from pivot opportunity program 122 to a user via network 110. User interface 132 can also display or present alerts including information (such as graphics, text, and/or sound) sent from pivot opportunity program 122 to a user via network 110. In an embodiment, user interface 132 is capable of sending and receiving data (i.e., to and from pivot opportunity program 122 via network 110, respectively).

Through user interface 132, a user can opt-in to pivot opportunity program 122, create a user profile, input information about the user's manufacturing machinery and the user's factory, set user preferences, manufacturing preferences, and alternative use preferences, receive automatic notifications about recommended alternative uses for the user's manufacturing machinery, request that an alternative use for the user's manufacturing machinery be determined, and/or input an alternative use for the user's manufacturing machinery. As used herein, a user is an individual who owns, leases, and/or operates manufacturing machinery. For example, a user can be a manager of a manufacturing company. For example, user interface 132 enables a user to create a user profile for pivot opportunity program 122, in which the user can input an inventory of available manufacturing machineries including a description of each available manufacturing machinery, as well as the manufacturing machinery's baseline measurements, production capabilities, throughput, etc.

A user preference is a setting that can be customized for a particular user. A set of default user preferences is assigned to each user of pivot opportunity program 122. A user preference editor can be used by the user to update values to set the user preferences. User preferences that can be customized include, but are not limited to, general user system settings, such as utilizing a local database and/or a public, crowd-sourced, cloud-based database to store data, application notification settings, specific user profile settings for pivot opportunity program 122, and machine-learned data. Machine-learned data includes, but is not limited to, data regarding past results of iterations of pivot opportunity program 122 and a user's previous response to a notification sent by pivot opportunity program 122. Machine-learned data comes from pivot opportunity program 122 self-learning appropriate alternative uses found by pivot opportunity program 122 through tracked user activity and user responses to notifications received with the purpose of improving each iterations of pivot opportunity program 122 to better coincide with how the user would react to each individual notification.

Local database 134 operates as a local repository for data received, used, and/or generated by pivot opportunity program 122. In some embodiments, a user may opt-out of sharing data generated by pivot opportunity program 122 in relation to the user's machinery and alternative uses identified for the user's machinery with database 124 and only allow data generated by pivot opportunity program 122 to be stored in local database 134. Local database 134 can be implemented with any type of device capable of storing data and configuration files that can be accessed and utilized by user computing device 130, such as a database server, a hard disk drive, or a flash memory. In an embodiment, local database 134 is accessed by pivot opportunity program 122 to store and/or to access the data. In the depicted embodiment, local database 134 resides on user computing device 130. In another embodiment, local database 134 may reside on another computing device, server, cloud server, or spread across multiple devices elsewhere (not shown) within distributed data processing environment 100, provided that pivot opportunity program 122 has access to local database 134.

Figure 2:
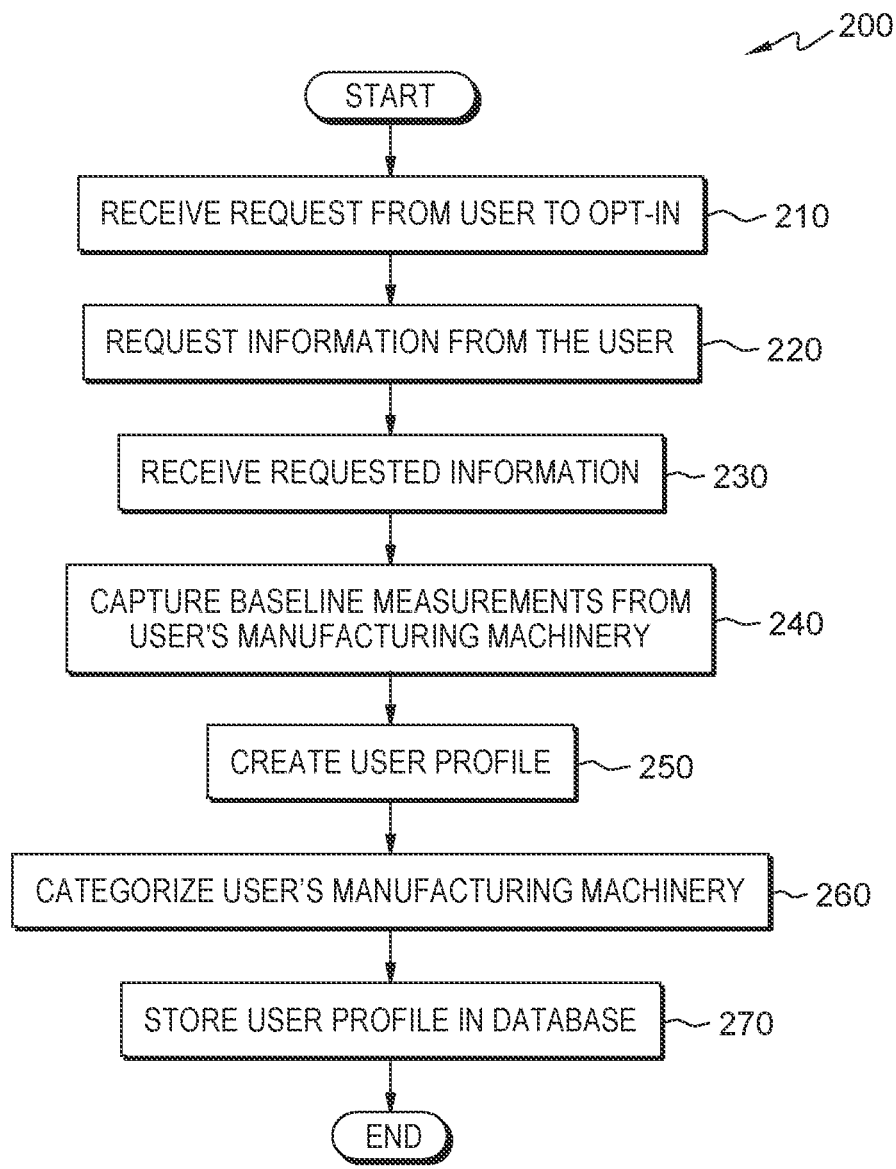
FIG. 2 is a flowchart depicting the operational steps of a setup component of a pivot opportunity program in a distributed data processing environment, such as the one depicted in FIG. 1, in accordance with an embodiment of the present invention.

FIG. 2 is a flowchart, generally designated 200, depicting the operational steps of a setup component of pivot opportunity program 122 on server 120 within distributed data processing environment 100 of FIG. 1, in accordance with an embodiment of the present invention. In an embodiment, pivot opportunity program 122 completes a one-time setup with a user looking for alternative uses of the user's manufacturing machinery. The one-time step allows for pivot opportunity program 122 to capture relevant information about the user and about the user's manufacturing machinery to create a user profile. In an embodiment, pivot opportunity program 122 receives a request from the user to opt-in. In an embodiment, pivot opportunity program 122 requests information from the user. In an embodiment, pivot opportunity program 122 receives the requested information from the user. In an embodiment, pivot opportunity program 122 captures baseline measurements from the user's manufacturing machinery. In an embodiment, pivot opportunity program 122 creates a user profile. In an embodiment, pivot opportunity program 122 categorizes the user's manufacturing machinery. In an embodiment, pivot opportunity program 122 stores the user profile. It should be appreciated that the process depicted in FIG. 2 illustrates one possible iteration of pivot opportunity program 122, which may be repeated for each opt-in request received by pivot opportunity program 122.

In step 210, pivot opportunity program 122 receives a request from the user to opt-in. In an embodiment, pivot opportunity program 122 receives a request from the user to opt-in to pivot opportunity program 122. In an embodiment, pivot opportunity program 122 receives a request from the user to opt-in to pivot opportunity program 122 through user interface 132 of user computing device 130. By opting-in, the user agrees to share data with database 124 and/or local database 134. For example, a manager of a bottle manufacturing company sends a request to opt-in to pivot opportunity program 122 through user interface 132 of user computing device 130.

In step 220, pivot opportunity program 122 requests information from the user. In an embodiment, pivot opportunity program 122 requests information from the user through user interface 132 of user computing device 130. In an embodiment, responsive to pivot opportunity program 122 receiving the request from the user to opt-in, pivot opportunity program 122 requests information from the user.

Information requested from the user includes, but is not limited to, information about the user's manufacturing machinery (e.g., blueprints of user's manufacturing machinery, items manufactured), information about the user's factory (e.g., types of manufacturing machinery, amount of each type of manufacturing machinery, number of employees, responsibilities of each employee), user preferences (e.g., general user system settings regarding alerts, such as for user device 130), frequency of alert preferences (e.g., an alert is sent at a set interval or an alert is sent every time pivot opportunity program 122 identifies alternative uses for the user's manufacturing machinery), manufacturing preferences (e.g., items the user prefers to manufacture, manufacturing machinery the user uses more frequently, manufacturing machinery the user uses less frequently), and alternative use preferences (e.g., alternative uses found from a safety perspective, alternative uses found from a production perspective, alternative uses found from an increased return on investment perspective).

In step 230, pivot opportunity program 122 receives the requested information from the user. In an embodiment, pivot opportunity program 122 receives requested information from the user through user interface 132 of user computing device 130. In an embodiment, responsive to pivot opportunity program 122 requesting information from the user, pivot opportunity program 122 receives the information from the user.

In step 240, pivot opportunity program 122 captures baseline measurements from the user's manufacturing machinery. A baseline measurement is a fixed point of reference that is used for comparison purposes. Baseline measurements captured from the user's manufacturing machinery include, but are not limited to, total manufacturing cycle time (i.e., the time required to convert raw materials into finished goods), total manufacturing output capacity, throughput (i.e., the average number of units being produced on a manufacturing machinery, line, unit or plant over a specified period of time), capacity utilization (i.e., the degree to which the total manufacturing output capacity is being utilized at a given point in time), overall effectiveness of a piece of production equipment and/or entire production line, schedule or production attainment scores (i.e., the actual production as a percentage of the scheduled production), planned maintenance percentage (i.e., the percentage of the total number of maintenance hours spent on planned maintenance activities in a given time period), availability (i.e., the ratio of operating time to planned production time), first pass yield (i.e., the percentage of products that are manufactured correctly and to specifications the first time without scrap, re-run, or rework), overall yield (i.e., the percentage of products produced that may, or may not, require re-work to fall within compliance and quality standards), customer returns (i.e., the number of times a customer rejected a product or requested a return because the customer received a product that was of poor quality or was out-of-specification), supplier quality incoming rate (i.e., the percentage of materials coming into the manufacturing process from a supplier), supplier defect rate (i.e., the percentage of materials from suppliers that do not meet quality specifications); customer fill rate, on-time delivery and perfect order percentage rate (i.e., the percentage of orders that are shipped in full and are shipped on time).

In an embodiment, pivot opportunity program 122 captures baseline measurements from an asset management platform of the user's manufacturing machinery. In one or more embodiments, pivot opportunity program 122 captures baseline measurements from a digital twin of the user's manufacturing machinery. In one or more embodiments, pivot opportunity program 122 captures baseline measurements through manual training. For example, a manager of a bottle manufacturing company manually enters "Manufacturing machinery A produces 100 long neck glass bottles per minute" into pivot opportunity program 122 through user interface 132 of user computing device 130.

In one or more embodiments, pivot opportunity program 122 captures baseline measurements through big data analytics clustering. In an example, pivot opportunity program 122 captures data stored in database 124 and/or local database 134, compares the data from the user's manufacturing machinery to data from clusters of manufacturing machinery with similar capabilities stored in database 134, and captures baseline measurements based on the comparison using big data analytics clustering as known to a person of skill in the art.

In one or more embodiments, pivot opportunity program 122 captures baseline measurements through natural language processing of metadata. Metadata includes, but is not limited to, written, oral, and visual metadata. In an embodiment, pivot opportunity program 122 captures metadata stored in database 124. In another embodiment, pivot opportunity program 122 captures metadata stored in local database 134. In an example, a bottle manufacturing company uses a cupping press, a bodymaker, an inside spray machine, a bottle former, and a visual inspection machine to produce metal beverage cans and bottles. Pivot opportunity program 122 uses natural language processing to analyze metadata of the description of the bottle manufacturing process, which includes a description of the tools used in the process, to generate a list of parts used in the bottle manufacturing process. Pivot opportunity program 122 stores the metadata of the description of the bottle manufacturing process in database 124.

The examples of pivot opportunity program 122 capturing baseline measurements are described herein with individual methods, but it should be noted that pivot opportunity program 122 may capture baseline measurements via one or more combinations of the above embodiments.

In an embodiment, pivot opportunity program 122 determines where to store the collected baseline measurements based on a selection or preference in the user profile. In some embodiments, pivot opportunity program 122 stores the collected baseline measurements in a local database, e.g., local database 134. In other embodiments, pivot opportunity program 122 stores the collected baseline measurement in a public, crowdsourced, cloud-based database, e.g., database 124.

In step 250, pivot opportunity program 122 creates a user profile. In an embodiment, pivot opportunity program 122 creates a user profile for the user. In an embodiment, pivot opportunity program 122 creates a user profile with information input by users during setup regarding the user's manufacturing machinery and the user's factory, as well as user preferences, alert notification preferences, manufacturing preferences, and alternative use preferences.

In step 260, pivot opportunity program 122 categorizes the user's manufacturing machinery. In an embodiment, pivot opportunity program 122 categorizes the user's manufacturing machinery using natural language processing. In an embodiment, pivot opportunity program 122 categorizes the user's manufacturing machinery using natural language processing into groups by usage. In one or more embodiments, pivot opportunity program 122 categorizes the user's manufacturing machinery using similar product identification in a cloud-based module of categorizations.

In step 270, pivot opportunity program 122 stores the user profile. In an embodiment, pivot opportunity program 122 stores the user profile for the user in a database. In some embodiments, pivot opportunity program 122 stores the user profile in a local database, e.g., local database 134. In other embodiments, pivot opportunity program 122 stores the user profile in a public, crowdsourced, cloud-based database, e.g., database 124.

Figure 3:
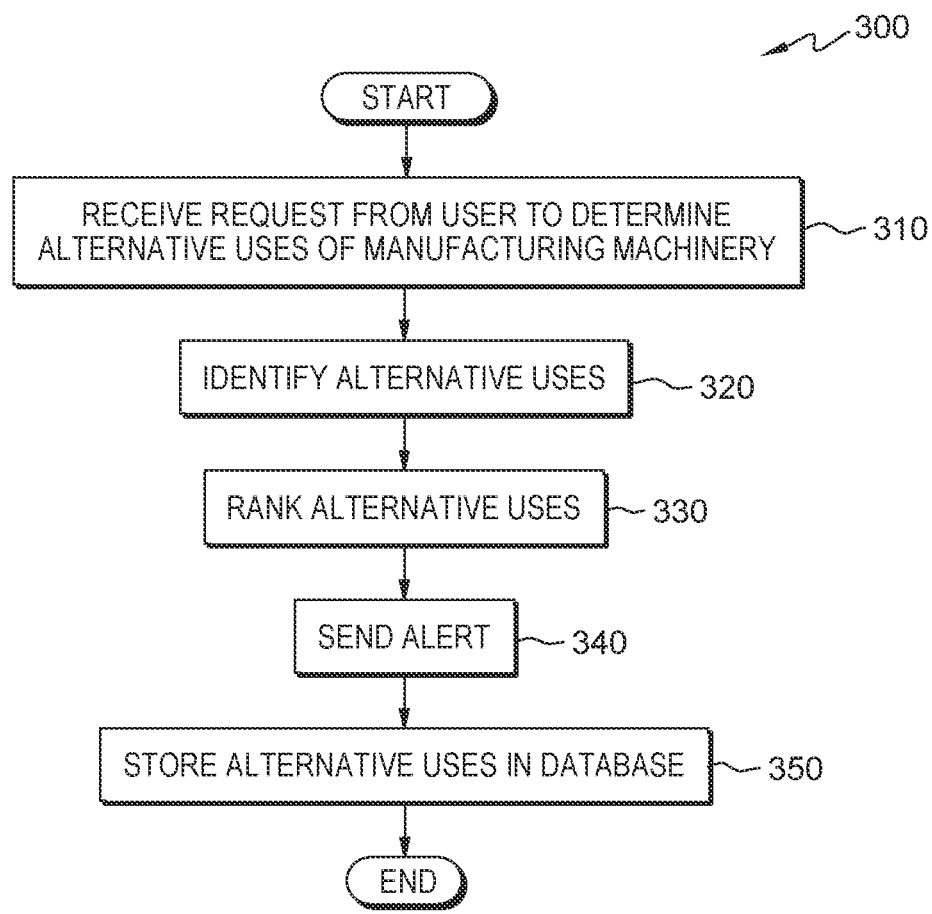
FIG. 3 is a flowchart depicting the operational steps for a pull component of the pivot opportunity program in a distributed data processing environment, such as the one depicted in FIG. 1, in accordance with an embodiment of the present invention.

FIG. 3 is a flowchart, generally designated 300, depicting the operational steps for a pull component of pivot opportunity program 122, in accordance with an embodiment of the present invention. In an embodiment, the pull component of pivot opportunity program 122, upon request from the user, identifies alternative uses for the user's manufacturing machinery then ranks the alternative uses using a set of factors and sends the user the list of ranked alternative uses. It should be appreciated that the process depicted in FIG. 3 illustrates one possible iteration of the process flow.

In step 310, pivot opportunity program 122 receives a request from the user. In an embodiment, pivot opportunity program 122 receives a request from the user to determine an alternative use for the user's manufacturing machinery. In an embodiment, pivot opportunity program 122 receives a request from the user to determine an alternative use for the user's manufacturing machinery through user interface 132 of user computing device 130. For example, a manager of bottle manufacturing company A sends a request to determine an alternative use for the manager's bottle manufacturing machinery to pivot opportunity program 122 through user interface 132 of user computing device 130.

In step 320, pivot opportunity program 122 identifies alternative uses. In an embodiment, pivot opportunity program 122 identifies alternative uses based on the user's manufacturing machinery and/or factory capabilities stored in the user profile. In other words, pivot opportunity program 112 identifies a pivot opportunity for the user's manufacturing machinery to produce an alternative item based on the machinery and/or factory capabilities.

In one or more embodiments, pivot opportunity program 122 identifies alternative uses through a cloud-based module that compares information about the user's manufacturing machinery and/or factory to information about other manufacturing machinery and factories stored in database 124. In an example, user A, a manager of a bottle manufacturing company, produces bottle X. The user opts-in to pivot opportunity program 122 and creates a user profile that is stored in the public, crowdsourced, cloud-based database 124. In an effort to increase profits, user A enters a request for pivot opportunity program 122 to determine an alternative use for user A's manufacturing machinery. In response to receiving a request from user A, pivot opportunity program 122 identifies a manufacturing machinery used by user B, a small business in Virginia, that is similar to user A's manufacturing machinery, but produces bottles Y and Z.

In one or more embodiments, pivot opportunity program 122 identifies alternative uses through industry and/or marketplace recommended alternatives. In an example, user A, a manager of a beverage company, produces plastic water bottles. The user opts-in to pivot opportunity program 122 and creates a user profile that is stored in the public, crowdsourced, cloud-based database 124. To reduce its use of plastic, user A enters a request for pivot opportunity program 122 to determine an alternative way for user A to bottle water. In response to receiving the request from user A, pivot opportunity program 122 identifies an industry recommended alternative of bottling water in aluminum cans.

In step 330, pivot opportunity program 122 ranks the identified alternative uses. In an embodiment, pivot opportunity program 122 ranks the identified alternative uses using a set of factors, which are weighted based on user's preferences, industry standards, and/or applicable regulations. The set of factors used to rank the identified alternative uses include, but are not limited to, the resources available to the user; the time required to modify, convert, and/or reorganize the manufacturing machinery from the original use to the new use; the cost required to modify and/or convert the manufacturing machinery; the projected revenue expected from the production of the new goods; whether the modifications will produce a higher return on investment (e.g., increase profits) or is done for the common good (e.g., manufacture high demand medical equipment and/or personal protective equipment); the skills needed by the labor force to operate the newly modified manufacturing machinery; the adjustments to the size of the labor force, and the permanency of the modifications.

In step 340, pivot opportunity program 122 sends an alert. In an embodiment, pivot opportunity program 122 sends an alert notifying the user of the alternative uses. In an embodiment, pivot opportunity program 122 sends an alert containing the list of ranked alternative uses and the factors used to rank the alternative uses. In an embodiment, pivot opportunity program 122 sends an alert to user computing device 130 to be output to the user through user interface 132.

In step 350, pivot opportunity program 122 stores the identified alternative uses and the factors used to rank the identified alternative uses. In an embodiment, pivot opportunity program 122 stores the identified alternative uses and the factors analyzed to rank the identified alternative uses for future iterative feedback. In an embodiment, pivot opportunity program 122 stores the identified alternative uses and the factors analyzed to rank the identified alternative uses in a local database, e.g., local database 134. In another embodiment, pivot opportunity program 122 stores the identified alternative uses and the factors analyzed to rank the identified alternative uses in a public, crowdsourced, cloud-based database, e.g., database 124.

Figure 4:
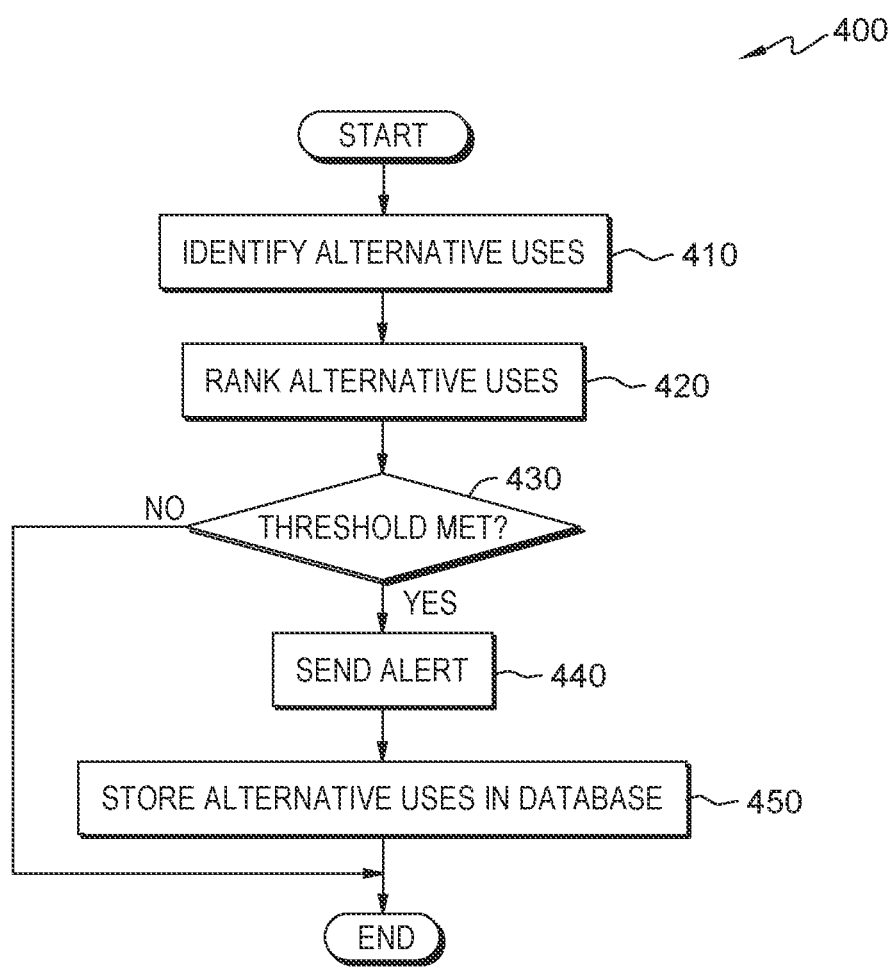
FIG. 4 is a flowchart depicting the operational steps for a push component of the pivot opportunity program in a distributed data processing environment, such as the one depicted in FIG. 1, in accordance with an embodiment of the present invention.

FIG. 4 is a flowchart, generally designated 400, depicting the operational steps for a push component of pivot opportunity program 122, in accordance with an embodiment of the present invention. In an embodiment, the push component of pivot opportunity program 122 identifies alternative uses for the user's manufacturing machinery then ranks the alternative uses using a set of factors and sends the user the list of ranked alternative uses when a threshold is met. In an embodiment, the push component of pivot opportunity program 122 runs iteratively as information is provided by the user and/or as the public-cloud database is updated. It should be appreciated that the process depicted in FIG. 4 illustrates one possible iteration of the process flow.

In step 410, pivot opportunity program 122 identifies alternative uses. In an embodiment, pivot opportunity program 122 identifies alternative uses based on the user's manufacturing machinery and/or factory capabilities stored in the user profile. In other words, pivot opportunity program 112 identifies a pivot opportunity for the user's manufacturing machinery to produce an alternative item based on the machinery and/or factory capabilities.

In one or more embodiments, pivot opportunity program 122 identifies alternative uses through a cloud-based module that compares information about the user's manufacturing machinery and/or factory to information about other manufacturing machinery and factories stored in database 124. In an example, user A, a manager of a bottle manufacturing company, produces bottle X. The user opts-in to pivot opportunity program 122 and creates a user profile that is stored in the public, crowdsourced, cloud-based database 124. In an effort to increase profits, user A enters a request for pivot opportunity program 122 to determine an alternative use for user A's manufacturing machinery. In response to receiving a request from user A, pivot opportunity program 122 identifies a manufacturing machinery used by user B, a small business in Virginia, that is similar to user A's manufacturing machinery, but produces bottles Y and Z.

In one or more embodiments, pivot opportunity program 122 identifies alternative uses through industry and/or marketplace recommended alternatives. In an example, user A, a manager of a beverage company, produces plastic water bottles. The user opts-in to pivot opportunity program 122 and creates a user profile that is stored in the public, crowdsourced, cloud-based database 124. To reduce its use of plastic, user A enters a request for pivot opportunity program 122 to determine an alternative way for user A to bottle water. In response to receiving the request from user A, pivot opportunity program 122 identifies an industry recommended alternative of bottling water in aluminum cans.

In step 420, pivot opportunity program 122 ranks the identified alternative uses. In an embodiment, pivot opportunity program 122 ranks the identified alternative uses using a set of factors, which are weighted based on user's preferences, industry standards, and/or applicable regulations. The set of factors used to rank the identified alternative uses include, but are not limited to, the resources available to the user, the time required to modify, convert, and/or reorganize the manufacturing machineries from the original use to the new use, the cost required to modify and/or convert the manufacturing machineries, the projected revenue expected from the production of the new goods, whether the modifications will produce a higher return on investment (e.g., increase profits) or is done for the common good (e.g., manufacture high demand medical equipment and/or personal protective equipment), the skills needed by the labor force to operate the newly modified manufacturing machineries, the adjustments to the size of the labor force, and the permanency of the modifications.

In decision 430, pivot opportunity program 122 determines whether a pre-set threshold has been met. In an embodiment, pivot opportunity program 122 determines whether a pre-set threshold for determining to push an alert to the user of the identified alternative uses has been met. In an embodiment, pivot opportunity program 122 determines whether a pre-set threshold has been met by assessing the identified alternative uses extracted in step 410. In some embodiments, the threshold for determining to push an alert to the user of the alternative use is pre-configured by the user through user interface 132 of user computing device 130.

In one or more embodiments, pivot opportunity program 122 pre-configures the threshold for determining to push an alert to the user to be triggered when the return on investment of the alternative use is calculated to be greater than the return the user is currently making. In an example, pivot opportunity program 122 pre-configures the threshold for determining to push an alert to the user to be triggered when the return on investment of the alternative use is two times greater than the return the user is currently making.

In one or more embodiments, pivot opportunity program 122 pre-configures the threshold for determining to push an alert to the user to be triggered when a new safety precaution is available that can be implemented to improve safety standards and to increase production performance rates. In an example, including, but not limited to, pivot opportunity program 122 pre-configures the threshold for determining to push an alert to the user to be triggered when a new day-to-day checklist is available that will improve the user's overall manufacturing process.

If pivot opportunity program 122 determines the pre-set threshold has been met (decision 430, YES branch), then pivot opportunity program 122 sends an alert notifying the user of the identified alternative uses (step 440). If pivot opportunity program 122 determines the pre-set threshold has not been met (decision 430, NO branch), then pivot opportunity program 122 ends.

In step 440, pivot opportunity program 122 sends an alert. In an embodiment, pivot opportunity program 122 sends an alert notifying the user of the alternative uses. In an embodiment, pivot opportunity program 122 sends an alert containing the list of ranked alternative uses and the set of factors used to rank the alternative uses. In an embodiment, pivot opportunity program 122 sends an alert to user computing device 130 to be output to the user through user interface 132.

In step 450, pivot opportunity program 122 stores the identified alternative uses and the set of factors used to rank the identified alternative uses. In an embodiment, pivot opportunity program 122 stores the identified alternative uses and the set of factors analyzed to rank the identified alternative uses for future iterative feedback. In an embodiment, pivot opportunity program 122 stores the identified alternative uses and the set of factors analyzed to rank the identified alternative uses in a local database, e.g., local database 134. In another embodiment, pivot opportunity program 122 stores the identified alternative uses and the set of factors analyzed to rank the identified alternative uses in a public, crowdsourced, cloud-based database, e.g., database 124.

Figure 5:
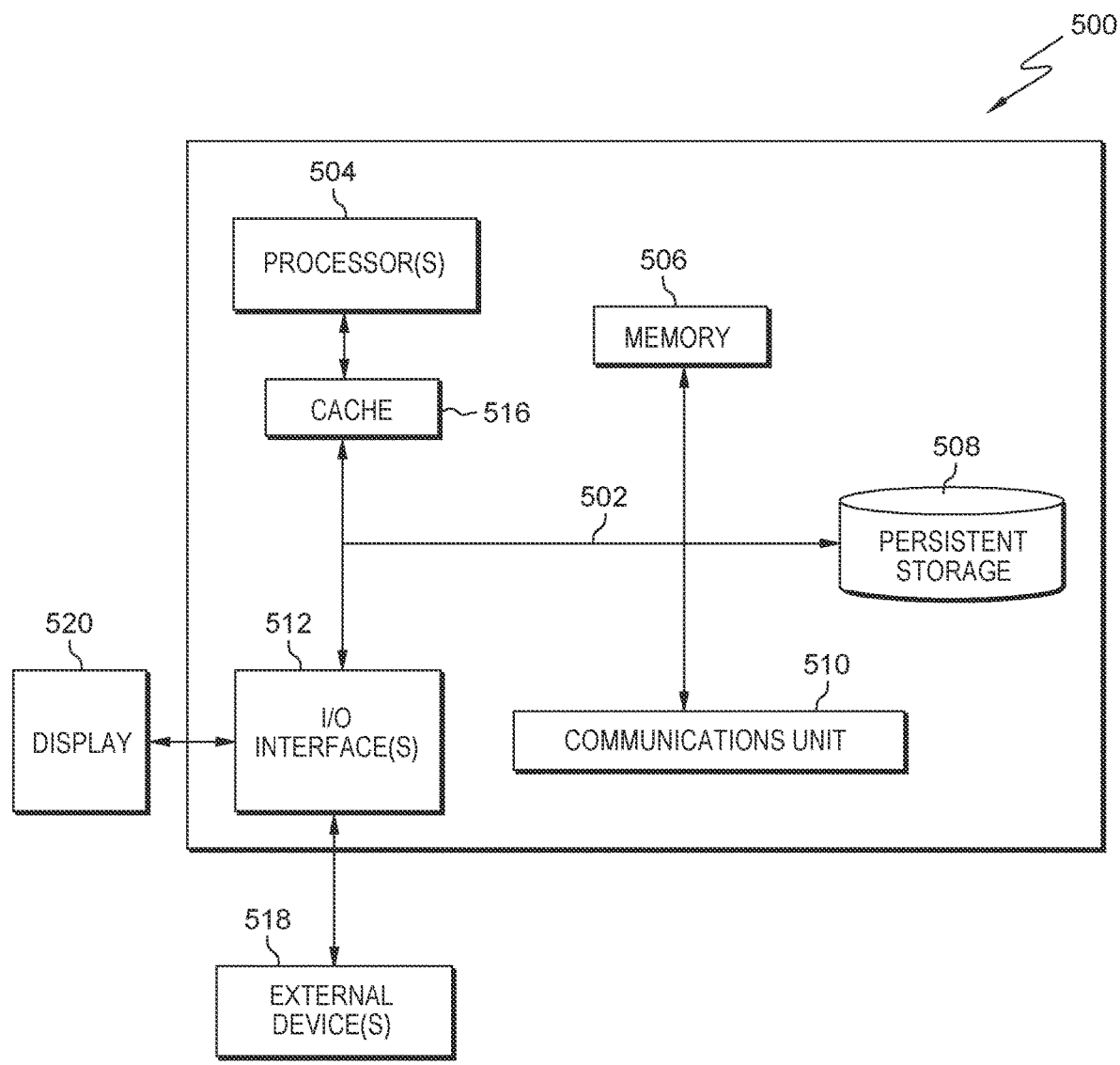
FIG. 5 is a block diagram of the components of a computing device of the distributed data processing environment of FIG. 1, in accordance with an embodiment of the present invention.

FIG. 5 is a block diagram of the components of computing device 500, suitable for server 120 and/or user computing device 130 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to server 120 and/or user computing device 130. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    capturing, by one or more processors, baseline measurements of machinery of a user;
    identifying, by the one or more processors, a plurality of alternative uses for the machinery from a public cloud database based on the baseline measurements of the machinery, wherein for each alternative use the machinery would be modified to produce an alternative good;
    ranking, by the one or more processors, the plurality of alternative uses for the machinery based on a set of factors, wherein the set of factors are selected from the group consisting of: a time required to modify the machinery, a cost required to modify the machinery, a projected revenue expected from a production of a respective alternative good, a return on investment from a modification of the machinery, and a permanency of the modification of the machinery; and
    sending, by the one or more processors, the ranked plurality of alternative uses for the machinery to the user.

2. The method of claim 1, wherein identifying the plurality of alternative uses for the machinery from the public cloud database based on the baseline measurements of the machinery further comprises:
    comparing, by the one or more processors, the baseline measurements of the machinery to information about uses for other machinery stored in the public cloud database.

3. The method of claim 1, wherein the baseline measurements of the machinery comprising a set of blueprints, a current use, a total manufacturing cycle time, a total manufacturing output capacity, a throughput, a capacity utilization, an overall effectiveness of a piece of production equipment, an overall effectiveness of an entire production line, a production attainment score, a planned maintenance percentage, an availability, a first pass yield, an overall yield, a customer return, a supplier quality incoming rate, a supplier defect rate, and a customer fill rate, anon-time delivery, and a perfect order percentage rate.

4. The method of claim 1, wherein identifying the plurality of alternative uses for the machinery from the public cloud database based on the baseline measurements of the machinery further comprises:
    identifying, by the one or more processors, at least one of an industry recommended alternative use and a marketplace recommended alternative use.

5. The method of claim 1 further comprising: determining, by the one or more processors, whether a threshold is met; and wherein sending the ranked plurality of alternative uses for the machinery to the user comprises:
    responsive to determining the threshold is met, sending, by the one or more processors, the ranked plurality of alternative uses for the machinery to the user.

6. The method of claim 1, wherein the public cloud database is crowd sourced.

7. A non-transitory computer program product comprising:
    one or more computer readable hardware storage media and program instructions stored on the one or more computer readable hardware storage media, the program instructions comprising:
    program instructions to capture baseline measurements of machinery of a user;
    program instructions to identify a plurality of alternative uses for the machinery from a public cloud database based on the baseline measurements of the machinery, wherein for each alternative use the machinery would be modified to produce an alternative good;

program instructions to rank the plurality of alternative uses for the machinery based on a set of factors, wherein the set of factors are selected from the group consisting of: a time required to modify the machinery, a cost required to modify the machinery, a projected revenue expected from a production of a respective alternative good, a return on investment from a modification of the machinery, and a permanency of the modification of the machinery; and program instructions to send the ranked plurality of alternative uses for the machinery to the user.

8. The non-transitory computer program product of claim 7, wherein identifying the plurality of alternative uses for the machinery from a public cloud database based on the baseline measurements of the machinery further comprises:

program instructions to compare the baseline measurements of the machinery to information about uses for other machinery stored in the public cloud database.

9. The non-transitory computer program product of claim 7, wherein the baseline measurements of the machinery comprising a set of blueprints, a current use, a total manufacturing cycle time, a total manufacturing output capacity, a throughput, a capacity utilization, an overall effectiveness of a piece of production equipment, an overall effectiveness of an entire production line, a production attainment score, a planned maintenance percentage, an availability, a first pass yield, an overall yield, a customer return, a supplier quality incoming rate, a supplier defect rate, and a customer fill rate, anon-time delivery, and a perfect order percentage rate.

10. The non-transitory computer program product of claim 7, wherein identifying the plurality of alternative uses for the machinery from a public cloud database based on the baseline measurements of the machinery further comprises:

program instructions to identify at least one of an industry recommended alternative use and a marketplace recommended alternative use.

11. The non-transitory computer program product of claim 7 further comprising:

program instructions to determine whether a threshold is met; and wherein sending the ranked plurality of alternative uses for the machinery to the user comprises:

responsive to determining the threshold is met, program instructions to send the ranked plurality of alternative uses for the machinery to the user.

12. The non-transitory computer program product of claim 7, wherein the public cloud database is crowd sourced.

13. A non-transitory computer system comprising:

one or more computer processors; one or more computer readable hardware storage media;

program instructions collectively stored on the one or more computer readable hardware storage media for execution by at least one of the one or more computer processors, the stored program instructions comprising:

program instructions to capture baseline measurements of machinery of a user; program instructions to identify a plurality of alternative uses for the machinery from a public cloud database based on the baseline measurements of the machinery, wherein for each alternative use the machinery would be modified to produce an alternative good;

program instructions to rank the plurality of alternative uses for the machinery based on a set of factors, wherein the set of factors are selected from the group consisting of: a time required to modify the machinery, a cost required to modify the machinery, a projected revenue expected from a production of a respective alternative good, a return on investment from a modification of the machinery, and a permanency of the modification of the machinery; and program instructions to send the ranked plurality of alternative uses for the machinery to the user.

14. The non-transitory computer system of claim 13, wherein identifying the plurality of alternative uses for the machinery from a public cloud database based on the baseline measurements of the machinery further comprises:

program instructions to compare the baseline measurements of the machinery to information about uses for other machinery stored in the public cloud database.

15. The non-transitory computer system of claim 13, wherein the baseline measurements of the machinery comprising a set of blueprints, a current use, a total manufacturing cycle time, a total manufacturing output capacity, a throughput, a capacity utilization, an overall effectiveness of a piece of production equipment, an overall effectiveness of an entire production line, a production attainment score, a planned maintenance percentage, an availability, a first pass yield, an overall yield, a customer return, a supplier quality incoming rate, a supplier defect rate, and a customer fill rate, anon-time delivery, and a perfect order percentage rate.

16. The non-transitory computer system of claim 13, wherein identifying the plurality of alternative uses for the machinery from a public cloud database based on the baseline measurements of the machinery further comprises:

program instructions to identify at least one of an industry recommended alternative use and a marketplace recommended alternative use.

17. The non-transitory computer system of claim 13 further comprising: program instructions to determine whether a threshold is met; and wherein sending the ranked plurality of alternative uses for the machinery to the user comprises: responsive to determining the threshold is met, program instructions to send the ranked plurality of alternative uses for the machinery to the user.

* * * * *